United States Patent [19]
Kobes

[11] Patent Number: 6,116,270
[45] Date of Patent: Sep. 12, 2000

[54] PISTON VALVE

[75] Inventor: Frederick Kobes, Mount Gambier, Australia

[73] Assignee: Hydro-Flo Holdings Pty Ltd., Australia

[21] Appl. No.: 09/011,511

[22] PCT Filed: Jul. 29, 1996

[86] PCT No.: PCT/AU96/00476

§ 371 Date: Feb. 4, 1998

§ 102(e) Date: Feb. 4, 1998

[87] PCT Pub. No.: WO97/06319

PCT Pub. Date: Feb. 20, 1997

[30] Foreign Application Priority Data

| Aug. 4, 1995 | [AU] | Australia | PN 4647 |
| Nov. 13, 1995 | [AU] | Australia | PN 6503 |
| Mar. 7, 1996 | [AU] | Australia | PN 8485 |

[51] Int. Cl.[7] ............ F16K 31/12; F16K 21/04
[52] U.S. Cl. ............ 137/494; 137/533.31; 137/496
[58] Field of Search ............ 137/533.31, 533.21, 137/533.17, 533, 565.36, 496, 494; 417/434

[56] References Cited

U.S. PATENT DOCUMENTS

| 2,244,051 | 6/1941 | Collins | 417/434 |
| 2,752,861 | 7/1956 | Hill | 417/434 |
| 4,350,178 | 9/1982 | Nelson et al. | |
| 4,691,778 | 9/1987 | Pyne | |
| 4,747,426 | 5/1988 | Weevers | |
| 4,856,756 | 8/1989 | Combs | 251/297 |
| 5,180,443 | 1/1993 | Voss | 137/494 |
| 5,479,988 | 1/1996 | Appleton | |

FOREIGN PATENT DOCUMENTS

| 65 970/81 | of 0000 | Australia |
| 25 07 313 | 9/1976 | Germany |
| 36 45 085 | 10/1989 | Germany |
| WO 93/11336 | 6/1993 | WIPO |
| WO 97/06319 | 2/1997 | WIPO |

*Primary Examiner*—Henry Bennett
*Attorney, Agent, or Firm*—Quarles & Brady LLP

[57] ABSTRACT

A piston valve wherein a hollow piston type sleeve has a closed lower end surmounted by a sleeve which has a cylindrical outer surface which slides, and seals against a blank inner cylindrical surface portion of an outer body. Ports in the sleeve are moved into an open position of the valve as they traverse from the bank inner cylindrical surface portion towards the port of the outer body.

4 Claims, 2 Drawing Sheets

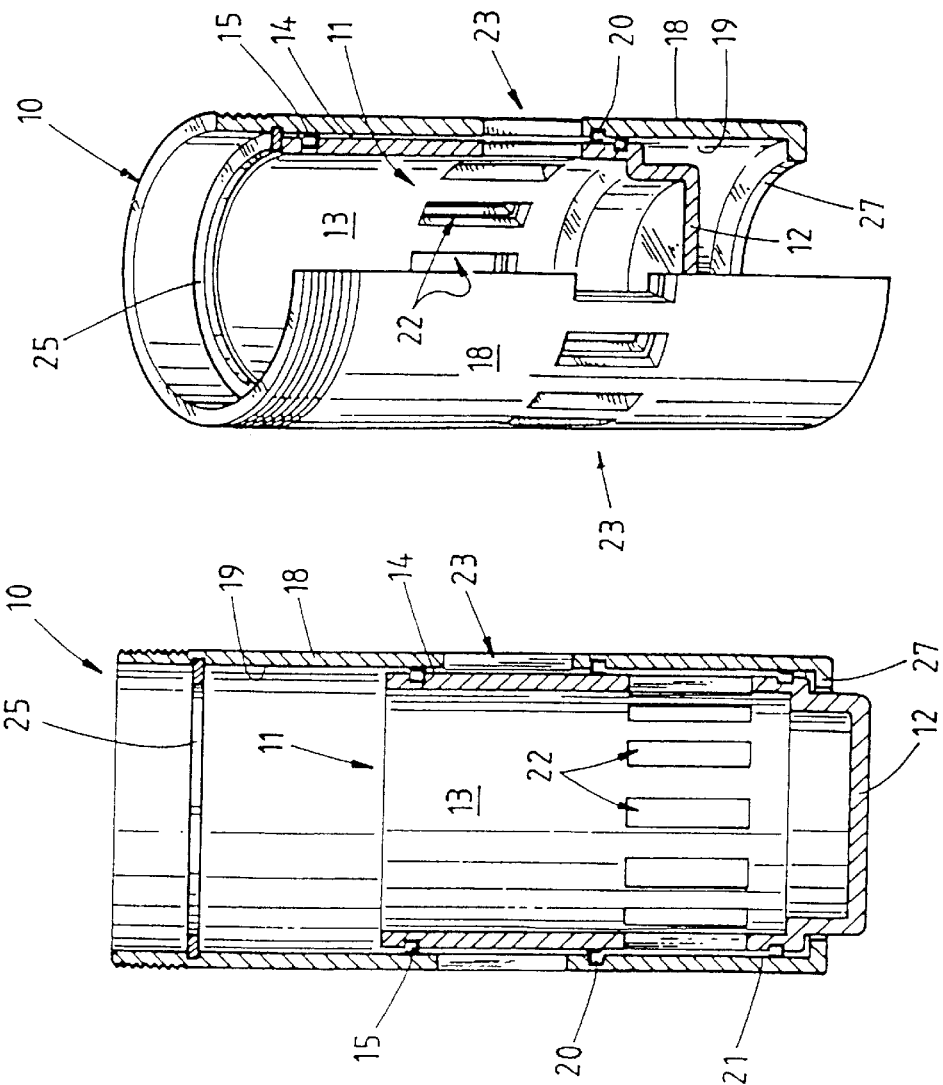

PISTON VALVE

BACKGROUND OF THE INVENTION

Foot valves which are used at the bottom of suction pipes in installations for the pumping of water are usually of the so-called "clacker" type of non-return valves, but there are two difficulties which are encountered when the liquid to be pumped is capable of entraining particulate matter such as sand, small pebbles or small pieces of rock. A foot valve according to prior art has almost invariably been of the type having a hinged closure member which, either upon hinging from an open to closure position, bears against a generally flat surface at the bottom of the valve, or a centre stem member spring loaded which serves a similar function. Such a valve is very inexpensive, but its use has resulted in a large amount of additional work for the user, since when the pump is not operating the valve is likely to be held partly open by debris in the bottom of the suction pipe, due to its initially being entrained by flow of water through the suction pipe. Thus the water which is contained within the suction pipe is free to leak back into the bottom of a bore hole, and re-starting the pump will require re-priming of the pump and this is both time consuming and in many cases quite awkward. One object of the invention therefore is to provide a valve which can be much less likely to malfunction, thereby making it more likely that the bore casing will contain water for a period of time after the valve has been closed and the pump has ceased operating.

BRIEF SUMMARY OF THE INVENTION

In one embodiment of the invention, use is made of a piston valve wherein a piston type sleeve has a closed lower end surmounted by a hollow sleeve wall which has an outer cylindrical surface, the outer cylindrical surface sealably engaging against a blank portion of the inner surface of an outer body in a sliding and sealing engagement when the valve is closed, but the inner and outer surfaces of the cylindrical body and the sleeve having respective ports which become sufficiently open to one another when the valve is open that liquid is free to flow through a port in the outer body and through a port in a side wall of the sleeve to the space within it, upon sliding movement of the sleeve away from the outer body blank portion.

Another difficulty which is encountered in prior art is that usually bore holes and bore casings are a little larger than the suction pipes which they hold, and the previously used clacker valves have usually had outer dimensions exceeding the dimensions of the bore casing so that the sealing surface of the valve would need to be smaller in diameter than the internal diameter of the suction pipe, thereby inhibiting flow rates.

In another aspect of the invention, the inner sleeve and outer body are generally circular and co-axial, and the inner sleeve is of diameter very little less than the inside diameter of a suction pipe, the movement being slidable and not hinging so that the need for an offset hinge pin is avoided.

In one embodiment, the invention may be said to reside in a valve for control of liquid flow which comprises an outer body having an inner cylindrical surface, a piston having a closed lower end surmounted by a hollow sleeve having an outer sealing surface in sliding and sealing engagement with the inner cylindrical surface, and surfaces defining between them ports in the outer body and in the hollow sleeve of the piston, the ports placing a space external of the outer body into fluid flow communication with a space internal of the sleeve when in an open position of the valve, but sealed against that fluid flow communication in a closed position of the sleeve within the body, which is axially spaced from the open position.

PRIOR ART

Efforts have been made by the Applicant by way of searches to ascertain the state of the art, since the Applicant had no knowledge of any sleeve type valve having been used as a foot valve or for analogous purposes.

Attention may be drawn to the Patent Application PCT/GB92/02198 disclosed in the searches, in the name of Appleton, which related to a mud check valve in drilling apparatus. In that specification there was a described a tubular valve member which was axially movable within the tubular body through a sleeve seal which was itself mounted in the body for sliding axial movement in an upstream direction away from a downstream stop. A compression spring urged the sleeve's seal in the downstream direction, but the function of the tubular sleeve was to further compress the spring upon the sudden back surge occurring in the pressure of mud, and in so doing, the bottom of the sleeve opened a fluid flow passage which enabled the back surge to be accommodated within the tubular sleeve and vented through slots in its side walls.

Although the specification described therein was the closest prior art disclosed by Applicant's searches, there was no arrangement whereby ports in the outer sleeve and the inner sleeve were placed into circuit to provide fluid flow communication with a space external of the sleeve, but closed against fluid flow communication in the closed position of the sleeve within the body. While the sleeve of Appleton had ports extending through its wall, those ports were essentially venting ports and were not intended for a fluid flow from the outer sleeve when the valve was open, the outer sleeve not being provided with any port for fluid flow. The valve was clearly not suitable for a replacement to the commonly used clacker valve of a bore hole.

Further applications or specifications which may be relevant are the Halliburton Australian Patent Application AU-A1 65 970/81 entitled "Check Valve Assembly" and the U.S. Pat. No. 4,747,426 in the name of Weevers, again for a "Check Valve".

BRIEF DESCRIPTION OF THE DRAWINGS

Three embodiments of the invention are described hereunder in some detail with reference to, and are illustrated in, the accompanying drawings in which:

FIG. 1 is a central elevational section through a piston valve according to a first embodiment, when the piston is in a closed position;

FIG. 2 is a partly sectioned isometric view of the valve of FIG. 1 when in an open position;

FIG. 4 is a central elevational section of the valve of FIG. 3 when it is open and showing the plane 4—4 on which FIG. 3 is taken.

Figure 3:
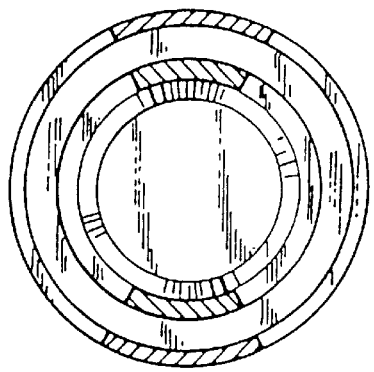
FIG. 3 is a plan section of valve according to a third embodiment.

Referring first to FIGS. 1 and 2, a valve 10 is depicted when used as a foot valve, and comprises a piston 11 which has closed lower end 12 which is surmounted by a hollow sleeve 13 the wall of which has an outer cylindrical surface 14 which is a sealing surface, incorporating an upwardly concave U-section sealing ring 15 at the top end of a generally cylindrical surface 14 and an upwardly concave U-section sealing ring at the bottom of a generally cylindrical surface 21.

An outer body 18 has a blank inner cylindrical surface 19 which is slidably and sealably engaged by the sleeve sealing surface 14 and its sealing ring 15 when the valve is closed. The surface 19 is provided with one downwardly concave U-section sealing ring 20 and this is traversed by the outer cylindrical surface 14 of the sleeve 13 as it moves upwardly from a closed position of FIG. 1 to an open position of FIG. 2.

The sleeve 13 is provided with surfaces which define a plurality of vertically extending slots 22, and as the sleeve 13 moves upwardly, those slots gradually come into fluid flow communication with slots 23 in the outer body 18 to provide a large area of water inflow from outside the outer body 18 into the space within the sleeve 13. The port area provided by the slots 22 and 23 as shown will considerably exceed the cross-sectional area of the outer body 18, and consequently the cross-sectional area of a bore casing to which it is attached.

A split C-ring 25 is contained in a slot near the upper end of the body 18 and that inhibits upward movement of the sleeve 13 beyond the point of maximum effective port area.

In use, the upper end of the outer body 18 is screwed into a coupling (not shown) to connect it in direct alignment with the lower end of a suction pipe, and when the sleeve is in its closed position of FIG. 1 and a bore pump is actuated, the upward pressure exerted against the closed lower end 12 of sleeve 13 greatly exceeds the pressure above the closed end 12 which is reduced by pump action, exerting considerable force to move the sleeve 13 upwardly. As sleeve 13 moves upwardly, the seal ring 20 scrapes the side wall, initially urging any debris adhering to that wall into the space surrounding the slots 22, while the lower seal ring 21 will scrape debris into the space below the sleeve 13.

Once the valve has lifted and water flow continues, the differential in pressure is reduced but there is still ample pressure difference to maintain the sleeve 13 in its open position. The upward force is enhanced by the upward flow of water through the ports 23 and upwardly through the side walls of the sleeve 13.

Once a pump is stopped however the sleeve is free to lower under its own weight, but that weight is assisted by the weight of the column of water above the sleeve lower end 12. Once the sleeve lower end 12 is arrested by an in-turned lip 27 at the lower end of the outer body 18, the U-shaped cup rings 15 and 20 will straddle the area above and below the slots 23 respectively, those being the two areas by which there can be discharge of water when the sleeve 13 is in its down or closed position, thus reducing the tendency for water to flow out of the suction pipe and back into the base of the bore hole.

In some arrangements, a closure spring is of particular value if the valve components are of plastic, but is unnecessary if of heavy weight bronze, as shown in FIGS. 1 and 2.

Figure 4:
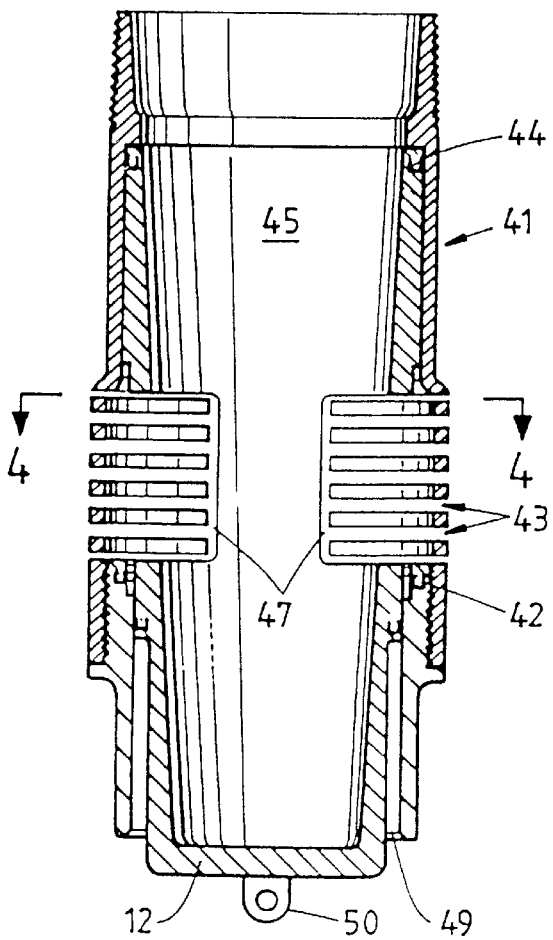
Figure 5:
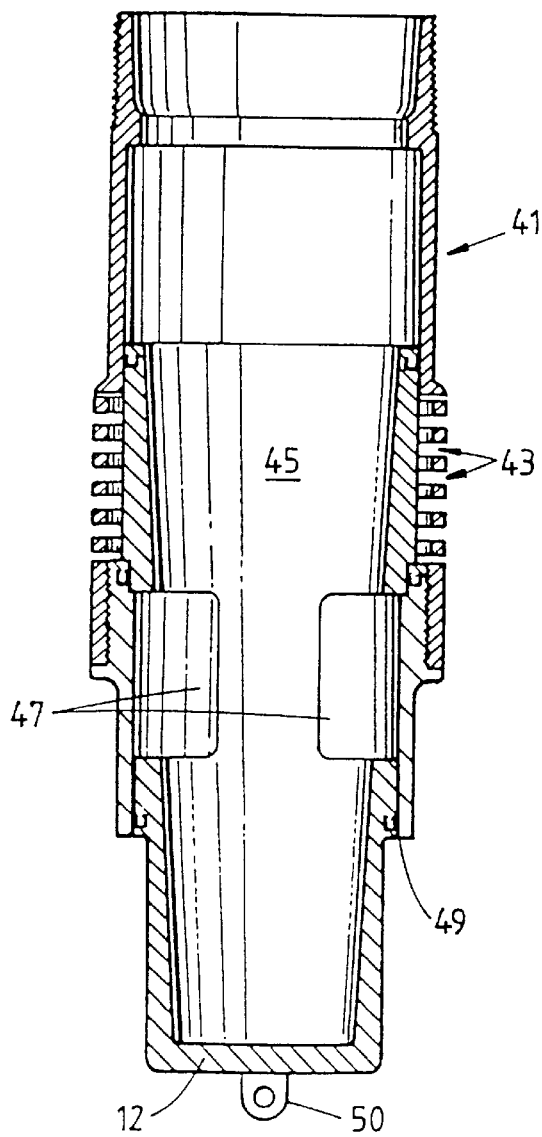
FIG. 5 is a sectional view showing the valve of FIGS. 3 and 4 when the piston is in a position wherein the valve is closed.

FIGS. 3, 4 and 5 show a further alternative to the first embodiment of FIGS. 1 and 2, one of the differences being that slots are circumferential instead of axial in their direction. This is achieved by having the sealing ring 42 of body 41 positioned to be a little below the slots 43, the upper sealing ring 44 being upwardly convex and carried near the upper end of sleeve 45, and when sleeve 45 is in its lowermost and closed position, that upper sealing ring 44 will not encounter the slots 43.

Slots 43 are in the body only, and the ports 47 are openings intermediate the ends of the sleeve 45 and are placed out of alignment as shown in which FIG. 5 when the sleeve 45 is in its downmost position. The downmost position is limited by an in-turned lip 49 in the lower end of body 41.

Sometimes there is a requirement that a column of water contained in a suction pipe be released, and to that end the lower surface of the sleeve 45 has a pair of depending lugs 50 each containing an aperture, the lugs having respective draw wires (not shown) extended through them and secured to them, and extending upwardly externally of the body 41, and movable so as to lift the sleeve 45 within the body 41.

Examination of each of the three embodiments will indicate that the invention provides a sleeve valve which will function as a foot valve in the case of a bore hole, and that some surfaces will be wiped upon operation by the respective sealing rings in a manner likely to dislodge any debris which may otherwise be deposited on the cylindrical surfaces. Although obviously of higher cost than the commonly used clacker valve, the sleeve valve does not require a larger diameter bore hole than the suction pipe and the need for a smaller bore hole more than offsets the additional cost of the valve. Initial experimentation has indicated that the valve is likely to be much longer lasting than the clacker or hinge type closure valves commonly used, and the valve surfaces tend to clear each other of debris rather than cause the debris to become adhered as with the commonly used foot valve.

The claims defining the invention are as follows:

1. A non-return foot valve having an open position and a closed position for control of liquid flow, comprising:

an outer body having a tubular wall with an inner cylindrical surface, said tubular wall having a blank portion;

a piston having a closed lower end surmounted by a hollow sleeve having a sleeve wall with an outer cylindrical surface which is slidably engageable with said blank portion said surfaces containing ports respectively communicating with a space external of said body and a space internal of the sleeve; and, three axially spaced sealing rings interposed between said tubular and sleeve walls, said outer body ports being adjacent to but above the intermediate of said sealing rings, said ports in said sleeve wall lie between the intermediate and lower of said sealing rings when said valve is in said closed position and lie between the intermediate and upper of said sealing rings when the valve is in its open position, said intermediate sealing ring sealing said blank portion of said body inner cylindrical surface by said sleeve outer cylindrical surface when said valve is in its closed position, but slidable movement of said sleeve away from said body blank portion placing said valve in its open position, whereby pressure by a fluid on the closed end of said sleeve effecting said slidable movement of said sleeve.

2. A valve according to claim 1, wherein said ports comprise slots in both said tubular wall and sleeve wall.

3. A valve according to claim 1, wherein said ports in said body comprise slots in said tubular wall thereof and the ports in said sleeve comprise openings which, upon axial movement of said sleeve from the closed to the open position of said valve, move from said blank portion of said body to be adjacent said slots.

4. A valve according to claim 3, comprising three axially spaced sealing rings interposed between said tubular and sleeve walls, said blank portion of said body lying between lower and intermediate said sealing rings and said slots lying between intermediate and upper said sealing rings.

* * * * *